Russell H. Reed
Edward N. Allen
INVENTORS

Russell H. Reed
Edward N. Allen
INVENTORS

BY Eugene D. Farley
Atty.

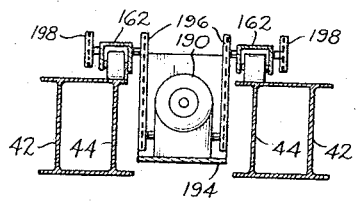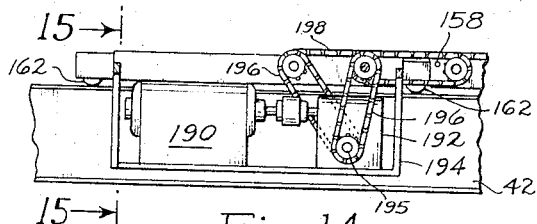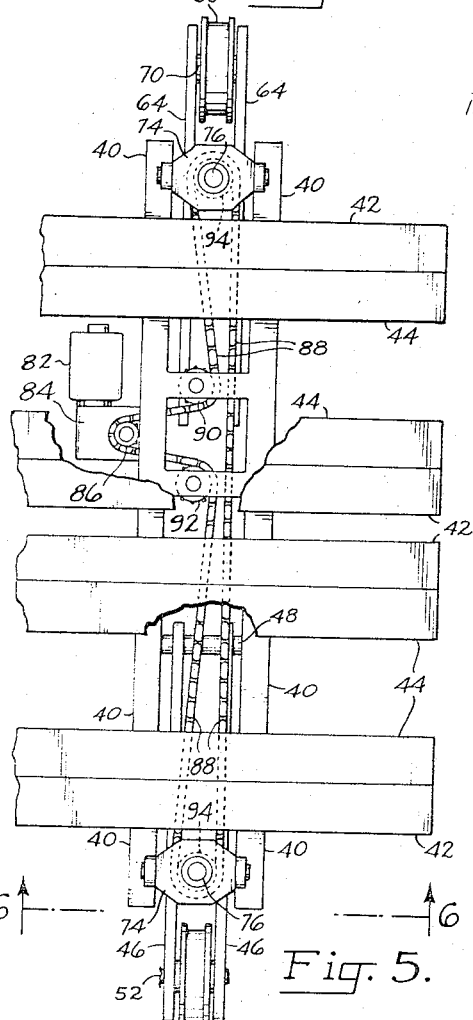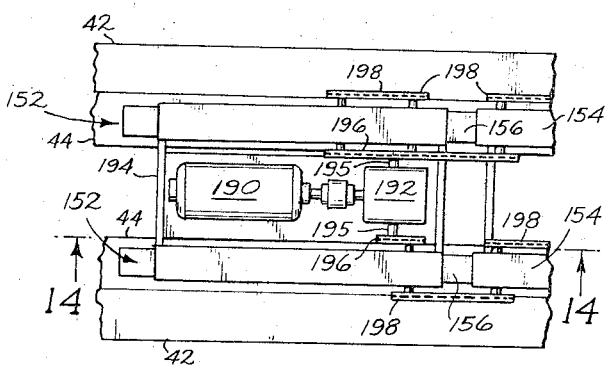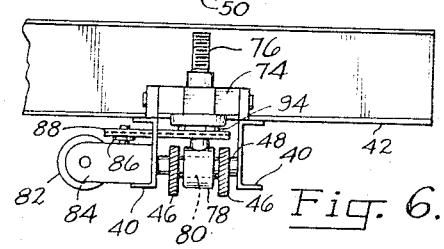

Russell H. Reed
Edward N. Allen
INVENTORS

Russell H. Reed
Edward N. Allen
INVENTORS

BY *Eugene O. Farley*

Atty.

United States Patent Office 3,337,066
Patented Aug. 22, 1967

3,337,066
VEHICLE LOADING AND UNLOADING
APPARATUS
Russell H. Reed, Puyallup, and Edward N. Allen, Tacoma, Wash., assignors to Star Iron & Steel Co., Tacoma, Wash., a corporation of Washington
Filed Jan. 18, 1965, Ser. No. 426,182
12 Claims. (Cl. 214—38)

This invention relates to apparatus for transferring loads between a loading station and a vehicle. Although the apparatus may be applied to the loading and unloading of vehicles of various classes such as trucks, railroad freight cars, aircraft and ships, as well as to the containerized movement of goods, it is applicable particularly to the loading and unloading of trucks and is described herein with particular reference thereto, but without limitation.

It is present day practice to load trucks by hand or by means of lift trucks or other conventional material handling equipment. Such practices are time-consuming, costly, often damaging to the goods and, where lift trucks are used, wasteful of the restricted space in the truck body because of the necessity of leaving head room for operation of the lift truck.

It is the general object of the present invention to provide apparatus for loading and unloading vehicles, particularly trucks, which provides significant advantages in that it:

(1) Loads and unloads at a high rate of speed.
(2) Transports load units rapidly from a remote place to the truck and vice versa.
(3) Handles the load units without dropping or damaging them.
(4) Rapidly selects load units from classified stock piles, making possible loading the truck with selected work units.
(5) Eliminates the necessity of utilizing a special loading dock.
(6) Is adaptable to loading work units of various sizes into vehicles of varying capacity without modifying the vehicle and without mounting auxiliary loading equipment thereon.
(8) Handles palletized and many categories of unpalletized units.
(9) Is operable either to load or unload the truck without modification of the apparatus.
(10) Makes possible effective use of the space available within the vehicle.

Generally stated, the vehicle loading and unloading apparatus which accomplishes the foregoing and other objects comprises a support frame positioned between a loading station and a vehicle. Desirably, the support frame may comprise a wheeled car moving on tracks.

A load carrying tongue reciprocatably is mounted on the frame. A frame conveyer is mounted on the frame for conveying a load unit between the loading station and the tongue. A tongue conveyer is mounted on the tongue communicating with the frame conveyer for conveying the load between the frame conveyer and the vehicle. Tongue drive means are connected to the tongue for reciprocating it between a retracted position in which it overlies the frame and an extended position in which it extends into the vehicle.

In use of the apparatus, the car is moved opposite the load unit at the selected loading station. The frame conveyer, cooperating with live rolls which may support the load unit at the loading station, loads the unit on the car.

The car then is moved opposite the truck or other vehicle and the tongue extended into the space to be loaded. The frame conveyer transfers the load unit to the conveyer with which the tongue is equipped. This transfers the load unit to the interior of the vehicle, where it is deposited. The tongue then is retracted and the car moved to the location of the next selected load unit.

When it is desired to unload the vehicle, the foregoing sequence is reversed.

Considering the foregoing in greater detail and with particular reference to the drawings, wherein:

FIG. 5 is a detail view in plan illustrating means for elevating one or the other of the respective sides of the support frame to adjust the level of the conveyers thereon to the level of the loading station or vehicle;

FIG. 6 is a detail transverse sectional view taken along line 6—6 of FIG. 5;

FIGS. 13 and 14 are a fragmentary detail view in plan and a longitudinal sectional view, respectively, of the conveyer means mounted on the tongue and the drive therefor; FIG. 14 being taken along line 14—14 of FIG. 13; and FIG. 15 is a detail sectional view taken along the line 15—15 of FIG. 14.

The loading and unloading apparatus of our invention may be applied to advantage to the transfer of work units between a loading dock 20 and a truck 22. The work units 24 preferably are mounted on pallets 26, although many types of load units do not need to be pallletized.

Figure 1:
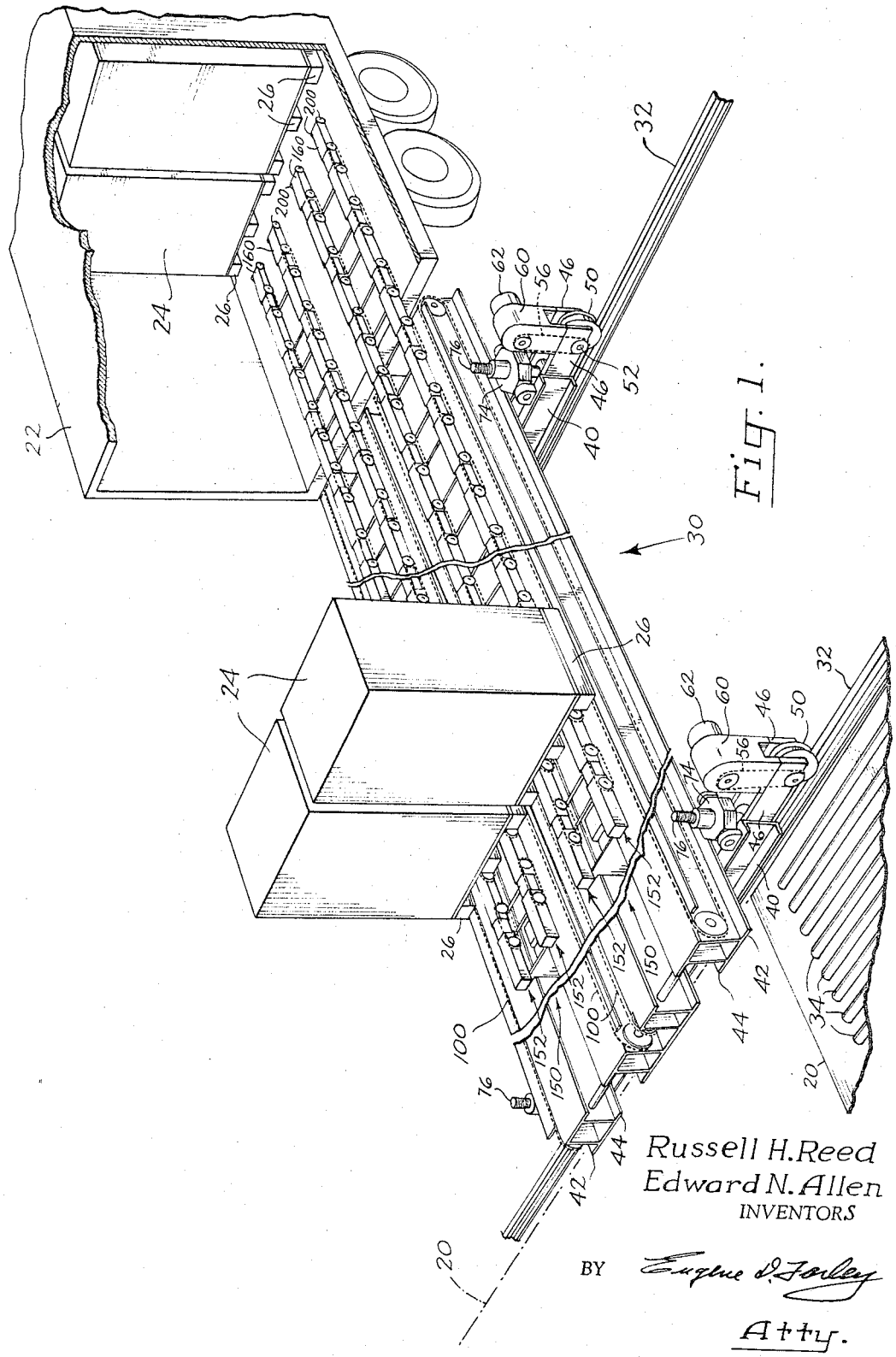
FIG. 1 is a fore-shortened perspective view of the presently described loading and unloading apparatus, illustrating its application to the transfer of load units between a loading station and a vehicle.

The apparatus includes a support frame which preferably is mobile, as for instance, the mobile car indicated generally at 30 in FIG. 1. The car moves on rails 32 interposed between loading dock 20 and truck 22, at right angles to the direction in which the load units move during the loading and unloading operations.

A primary purpose of the car is to transport the load units rapidly from a substantial distance into loading relation with the truck, thus eliminating the necessity of employing lift trucks for this purpose.

Preliminary to loading, the work units may be classified on the loading dock or an adjacent live or gravity roll assemblies 34. Car 30 then may be moved until it registers with the live rolls conveying work units of the selected class. The live rolls then assist in transferring the load units to the car which in turn moves them to a loading station and loads them into the truck. Normally the work units transferred in a single operation constitute ann entire truck load. However, if circumstances dictate handling a small number of units, the loading procedure may be repeated until the truck has been loaded completely with load units all arranged according to contents, destination or other factors.

As shown in FIGS. 1–6 inclusive, car 30 which serves as the mobile support frame for the loading and unloading units of the presently described assembly comprises two pairs of spaced, parallel, longitudinally arranged beams 40, one pair being located on each side of the apparatus. Longitudinal beams 40 support a plurality of pairs of transverse beams 42, 44. In apparatus designed to handle two palleted load units at a time, there are four such pairs of transverse beams, two pairs of which cooperate in handling one of the load units.

Support frame 30 is wheel-mounted in such a way that the elevation of one side or the other of the frame may be adjusted as required to register the frame with the loading station or the truck.

For this purpose a pair of spaced, outwardly extending, parallel lever arms 46 are nested between the ends of each pair of longitudinal beams 40. The inner ends of the lever arms are pivotally mounted between beams 40 by means of shaft 48. The outer ends of the lever arms rotatably mount a drive wheel 50 supported on a shaft 52 journaled between the ends of the lever arms. Shaft 52 mounts on its outer end a sprocket 54 which is connected by a chain 56 to sprocket 58 on a gear reducer 60 driven by reversible motor 62.

The construction of the rear wheel mounting is similar except that the rear wheel is not powered. Rearwardly extending lever arms 46 nest between the rear ends of beams 40. Their inner ends are pivotally mounted between the beams by means of a shaft 66. Their outer ends journal between them a wheel 68 which tracks on tracks 32 and is fixed to a shaft 70 journaled between the outer ends of lever arms 46.

The construction of the wheel mountings on the opposite side of the support frame are similar. Thus, by driving motors 62 forwardly or reversely, the support frame may be moved to any desired location on tracks 32 as required to position it opposite a particular dock station or a particular truck station. If it is desired to angle the loader to align it with the load, one or the other of motors 62 may be energized selectively, thereby moving one side of the car independently of the other, thus angling the frame to the required extent.

Jack screw means, such as are illustrated particularly in FIGS. 5 and 6, may be employed to advantage for elevation of one side or the other of the mobile support frame, in order to register it with the dock station or the truck.

A trunnion mounted nut 74 is secured across each end of each pair of longitudinal beams 40. A screw 76 is threaded into the nut. The lower end of the screw terminates in a thrust bearing 78. The latter is mounted on a shaft 80 supported across lever arms 46.

The two jack screws on each of the respective sides of the frame are driven in unison in the manner shown in FIG. 5.

A motor 82 drives a gear reducer 84 to the drive shaft of which is fixed a sprocket 86. The latter drives an endless chain 88 which meshes with idler-sprockets 90, 92 and with drive sprockets 94, one of which is keyed to the shaft of each of jack screws 76. A similar and independently operable jack screw drive is present on the opposite side of the support frame.

Accordingly, by driving one or the other pair of jack screws 76 in a clockwise or counterclockwise direction, lever arms 46, which mount wheels 50, 68, may be moved angularly upwardly or downwardly with respect to beams 40, thus raising or lowering one side of the frame independently of the other.

Conveyer means, termed herein the frame conveyer, is mounted on support frame 30 and works in a direction substantially at right angles to the axis of tracks 32 and hence of longitudinal beams 40. It serves the function of transferring the load units from the loading station to the support frame, preliminary to transferring the units from the support frame to the truck. The construction and manner of operation of the frame conveyer also is illustrated in detail in FIGS. 1–4 inclusive.

Mounted on each of transverse frame members 42 is an endless chain 100. In the illustrated form of the invention there are four such chains arranged in two cooperating pairs for moving two loads units at once. The construction of each of these pairs is identical with that of the other.

Figure 2:
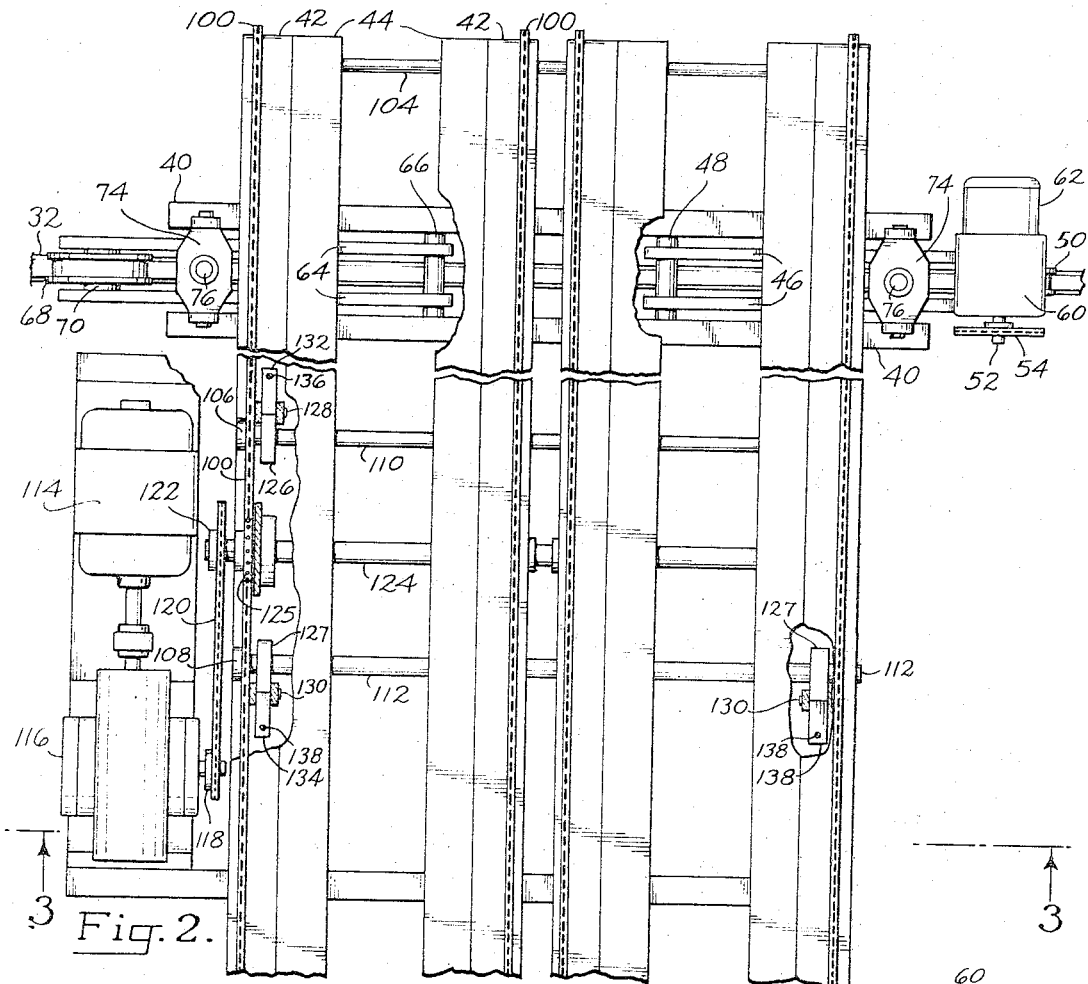
FIG. 2 is an enlarged fragmentary view of the main support frame, illustrated in the embodiment of a wheeled car, which supports the tongue, and of the frame conveyer means mounted thereon.
Figure 3:
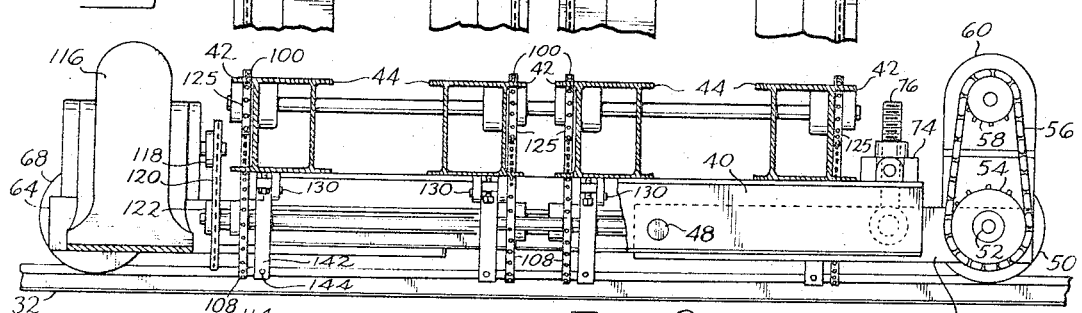
FIG. 3 is a transverse sectional view taken along line 3—3 of FIG. 2.

As seen in FIG. 2, the upper stretches of conveyer chains 100 are suitably guided across the tops of transverse frame members 42 and are designed to engage the under surfaces of the load units, thereby moving them across the support frame.

Chains 100 are mounted on idler sprockets 102 keyed to shafts 104 rotatably mounted on each end of the apparatus.

Chains 100 also engage a pair of chain-tightening sprockets 106, 108, fixed to shafts 110, 112, respectively, and maintaining the chains under proper tension, as will be described hereinafter.

Chains 100 are driven by motor 114 and gear reducer 116, the shaft of which mounts a sprocket 118. The latter meshes with a drive chain 120 which engages a sprocket 122 on a rotatably mounted shaft 124. This shaft mounts drive sprockets 125, one for each chain 100, and drives all of the chains synchronously.

Figure 4:
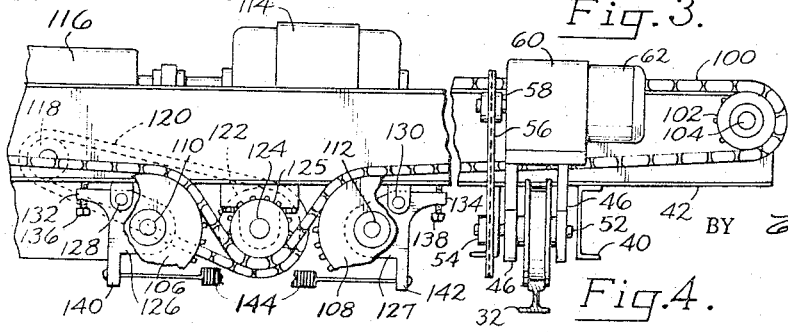
FIG. 4 is a detail view showing the construction and mode of operation of the main support frame conveyer.

It is important for the proper operation of chains 100 that they be maintained under suitable tension at all times, irrespective of the direction of their motion. The chain tensioning means employed for this purpose are illustrated in FIG. 4.

Shafts 110, 112 mounting chain-tightening sprockets 106, 108, respectively, are journaled in bearings 126, 127. The latter are pivoted to the frame by means of pivot pins 128, 130 respectively, so that each idler sprocket assembly can rotate about a center not its own.

Bearings 126, 127 are formed with first extensions 132, 134, respectively, through which are threaded stop bolts 136, 138, respectively. These are adjustable with respect to the adjacent surface of transverse frame member 42.

The bearings also are provided with second extensions 140, 142, respectively, between which is stretched a coil spring 144.

The arrangement above described serves to maintain chain 100 under tension at all times no matter what the direction of its motion. If drive sprocket 125 is rotated clockwise, as viewed in FIG. 4, tension is exerted on the segment of chain 100 to the right of the sprocket while slack is developed in the segment to the left.

However the tension developed in the segment to the right depresses chain-tensioning sprocket 108 by an amount determined by the position of stops 138. The entire tensioning sprocket assembly thereupon is rotated counterclockwise about pivot pin 130. Acting through spring 144, this rotates tensioning sprocket 106 assembly also in a counterclockwise rotation about pin 128. This elevates the sprocket assembly sufficiently to tension the slack left hand segment of chain 100.

The reverse sequence occurs when drive sprocket 126 is rotated in a counterclockwise direction.

Figure 7:
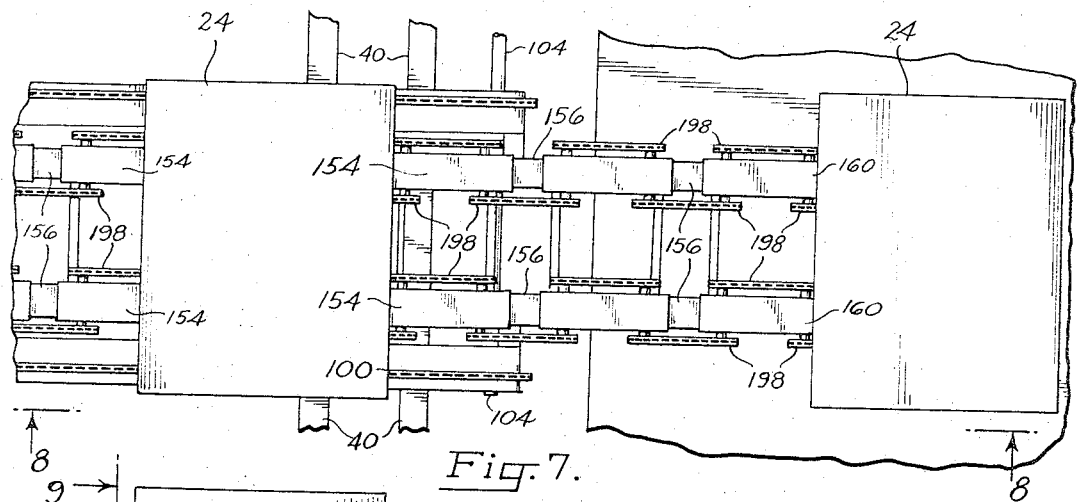
FIG. 7 is a fragmentary plan view of the apparatus of FIG. 1 illustrating particularly the construction and mode of operation of the extendable load carrying tongue which is a key component of the presently described apparatus.
Figure 8:
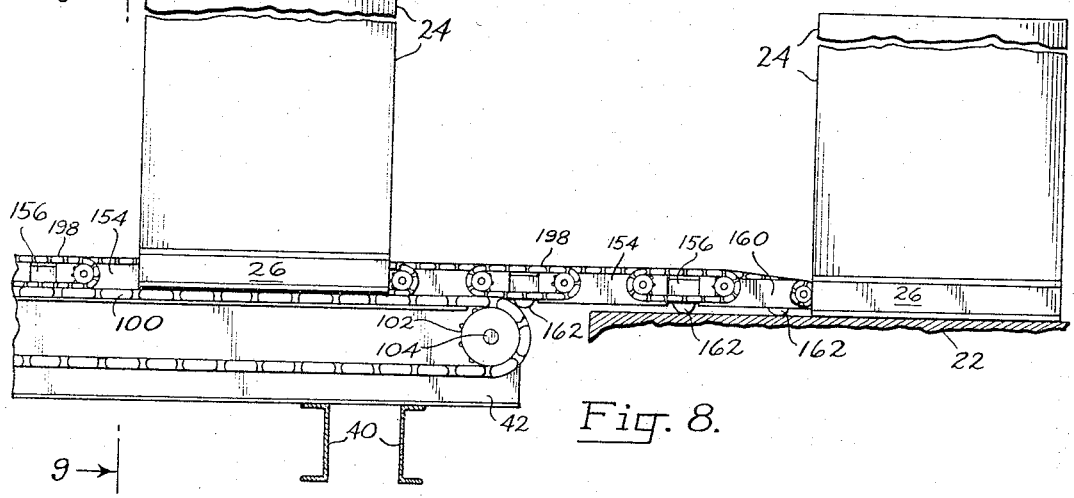
FIG. 8 is a fragmentary longitudinal sectional view, taken along line 8—8 of FIG. 7.
Figure 9:
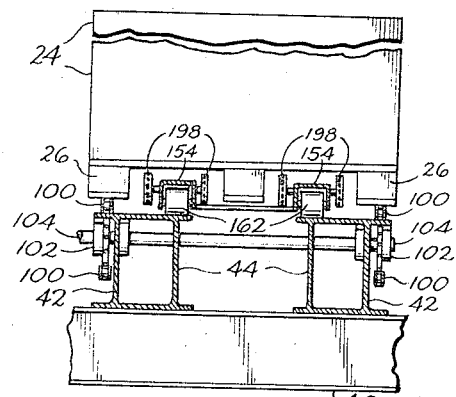
FIG. 9 is a detail transverse sectional view taken along line 9—9 of FIG. 8.

The construction of the load carrying tongue assembly mounted reciprocatably on the support frame and receiving the load units from frame conveyer chains 100 is depicted in FIGS. 7, 8 and 9.

In the illustrated form of the invention the tongue assembly includes two load supporting tongue units, one of which is indicated generally at 150 in FIG. 1. Each tongue unit is capable of conveying a load unit separately from the other. Each is a composite of two spaced, elongated tongue components 152 of substantially identical construction.

Each of the tongue components is comprised of a plurality of nesting, alternating, channel segments of relatively larger and smaller cross section indicated at 154, 156, respectively. The channel segments are articulated, one to the other, in a semi-rigid unit by means of pins 158. The outer terminal channel segment 160 is wedge-shaped so that it can be worked under a load unit, FIG. 1. Rollers 162 are journaled across the side walls of the channel segments at longitudinally spaced intervals.

Figure 10:
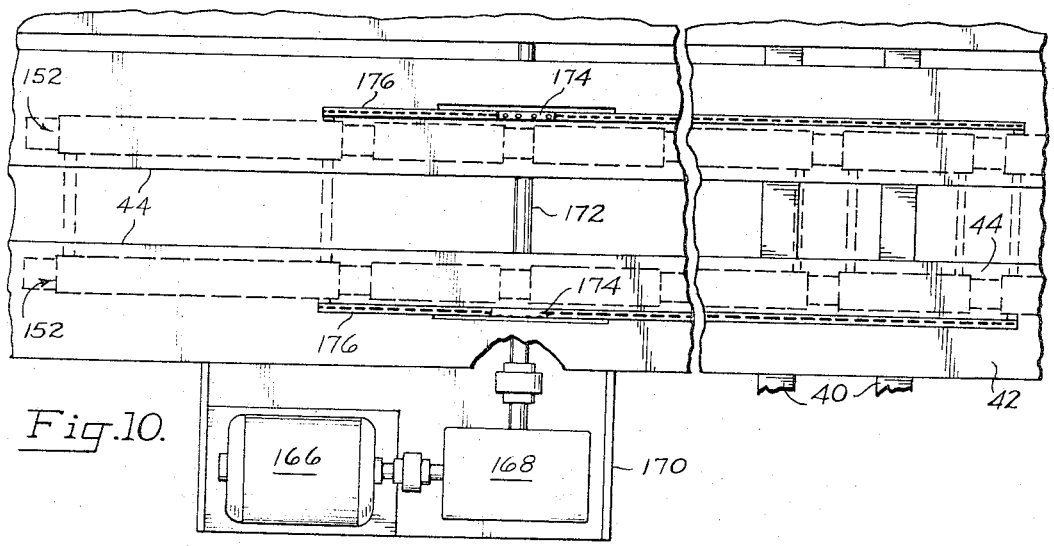
FIGS. 10 and 11 are fragmentary detail views in plan and side elevation respectively of the drive employed for extending and retracting the tongue with reference to the main support frame.
Figure 11:
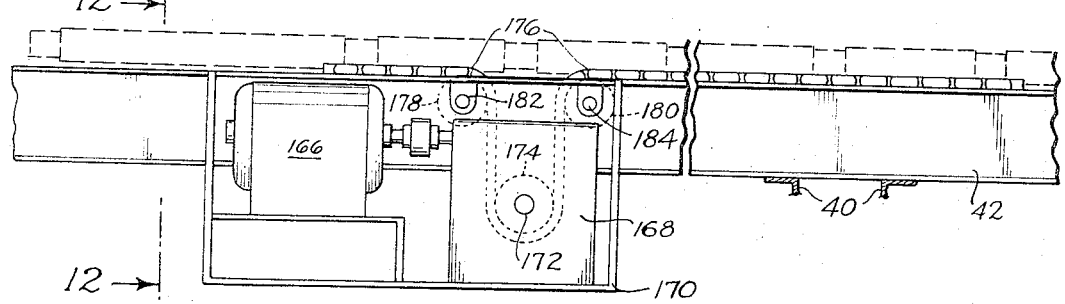
Figure 12:
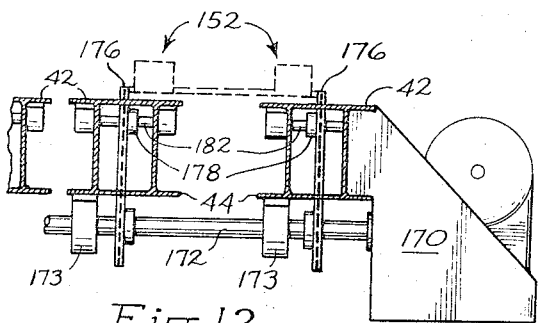
FIG. 12 is a detail transverse sectional view taken along line 12—12 of FIG. 11.

The drive for reciprocatably mounting load carrying tongue 150 on support frame 30 is illustrated particularly in FIGS. 10, 11, and 12.

A reversible motor 166 is coupled to a gear reducer 168 and both of these units are supported in a bracket 170 supported by transverse beams 42.

The shaft of gear reducer 168 is coupled to a drive shaft 172 journaled in bearings 173 suitably mounted on the transverse frame members. Drive sprockets 174 are keyed to the shaft and mesh with a length of chain 176 which extends almost the full length of the tongue member 152, to which it is fixed. Idler sprockets 178, 180 mounted on short shafts 182, 184 respectively, assist in supporting the chain and maintaining it in taut condition.

Energizing motor 166 in a direction which rotates drive shaft 172 in a counterclockwise direction, as viewed in FIG. 11, will extend tongue units 150 to the right in the direction of truck 22. However, upon reversing the motor, the chains will retract the tongue units to the left, i.e. to a position in which they overlie support frame 30.

As has been indicated above, load-carrying tongue units 150, each comprised of the pair of tongue components 152, are provided with conveyer means, termed herein the tongue conveyer, which communicates with the frame conveyer and conveys the load between the latter and the truck. The construction of the tongue conveyer and of the drive therefore are illustrated in detail in FIGS. 7–9 and 13–15 inclusive.

Basically the tongue conveyer comprises a plurality of endless chain segments arranged in staggered relationship on both sides of the channel tongue segments which mount them, and driven one from the other. The upper stretches of the endless chain segments and their sprockets engage the under surfaces of the load units, supporting them and moving them in the direction of travel of the chains.

Where palletized load units are being conveyed, the frame conveyers and tongue conveyers may be dimensioned and arranged with respect to each other in such a way that, as is evident in FIGS. 1 and 9, chains 100 engage and support the runners of the pallets, maintaining the plate portions of the pallets elevated so that they clear tongue units 150 which lie intermediate the runners. However, after the load units have been discharged from the frame conveyer, they drop into the tongue units, whereupon the chains and sprockets of the tonnage conveyer engage the under surface of the plate portions of the pallets, thereby engaging and supporting the load units as they are conveyed into the vehicle.

The tongue conveyer is driven by a reversible motor 190 connected to a gear reducer 192, both of these units being supported on a carriage 194 welded to the tongue units and moving with them as they are extended and retracted.

Gear reducer 192 is provided with diametrically opposed drive shafts 195, each of which is fitted with a sprocket and drives an endless chain segment 196. This in turn is fixed to a short shaft journaled across the ends of the other channel tongue segments 154, each shaft being provided at each of its ends with a sprocket. The sprockets of adjacent ends of the channel tongue segments then are connected by endless chain segments 198 arranged in the staggered relation particularly evident in FIGS. 7 and 8.

It will be noted in this connection that sprockets 200 on terminal channel tongue segments 160 of FIG. 1 are of smaller diameter than the remaining sprockets to conform to the wedge-shaped configuration of the terminal segment.

All of the endless chain segments are driven in a direction determined by the direction of rotation of motor 190. As they rotate, they serve the functions of engaging the underside of the load unit, impelling it in the desired direction, and transferring it to the truck in a truck loading operation, or to the support frame in a truck unloading operation.

*Operation*

The operation of the herein described vehicle loading and unloading apparatus is as follows:

In a typical case, trucks are to be loaded or unloaded with palletized work units classified on a loading dock and resting on live rolls or gravity conveyers 34 of FIG. 1. Truck 22 is backed up to the loading-unloading station on the opposite side of tracks 32 from loading dock 20.

In such a situation, assuming a 40 foot truck or trailer, the distance between rails 32 might be approximately 44 feet; the length of the load carrying tongues, 46 feet; and the distance between loading dock 20 and the rear end of the truck, 48 feet. These lengths may be modified, however, as required for particular vehicles and installations.

In the first, or load assembly, phase of the operation individual truck loads of materials may be assembled at the loading dock at one or more points on permanent storage conveyers 34, using fork lift trucks. Storage conveyers 34 may be short, truck length conveyers up to 40 feet long, or they may be long conveyers extending into or through a warehouse. Several assembly conveyers may be used if the volume of load units is large or where the order in which the load units will be required cannot be anticipated fully.

In the next phase of the operation, the load units 24 are loaded onto car 30 at a location which may be remote from truck 22.

The car is moved by motors 62 to the proper point to receive the load from the selected one of storage conveyers 34. Chains 100 then are set in motion and cooperate with storage conveyers 34, with which they are aligned, in transferring the desired number of load units onto the car. During the operation, if the load is palletized the runners of pallets 26 engage the upper stretches of chains 100.

After the desired number of load units has been transferred to the car from one or a plurality of loading stations, the car is driven by motors 62 until it is stationed in the position of FIG. 1, with the conveyers aligned with the longitudinal dimension of the truck body. At this stage, or at the stage in which the load units are loaded on the car, if there is a mis-matching of elevations, one end or the other of the load supporting frame work of the car may be elevated or lowered by driving one or the other of the pairs of jack screws 76 through the agency of motor 82 and drive chain 88, FIGS. 5 and 6.

After the load support frame of the car has been leveled with the truck body, load carrying tongues 150 are extended into the truck body substantially their full length. This is accomplished by energizing motor 166 which drives run-out chains 176, FIGS. 10, 11 and 12.

Motor 190 of the tongue conveyer then is energized in the desired direction. This drives staggered endless chain segments 198 of each of the tongue units 152. Upon continuing or initiating the drive of frame conveyer chains 100, load units 24 are pushed off the main support frame, where the runners of the pallets engage chains 100, onto the load-carrying tongues, where the underside of the pallet plate engages endless chain segments 198. Continued driving of the latter pushes the load units to the end of the truck.

As they move off the end of the tongue conveyer and rest on the truck bed, the force exerted by the conveyer forces the tongue toward the support frame which mounts it until it is entirely removed from beneath the work load unit. This process occurs again and again as each successive load unit is deposited.

It is to be noted that during the loading operation the flexibility of the articulated tongue units compensates for slight differences in elevation between the supporting frame and the truck bed, as well as for any roughness or unevenness of the latter. It also makes it possible to span any gap of reasonable dimensions which may be present between the support frame and the truck.

In case load bracing is required, the motion of frame conveyer chains 100 may be arrested from time to time after part of the load units have been moved out onto the tongue. The load bracing then may be installed after which the frame conveyer may be again started.

After the load has been transferred completely to the truck, the tongue is retracted, the elevation of the support frame on the car returned to dock height and the car moved to its next operational position.

When used for unloading vehicles, the foregoing sequence is substantially reversed. It will be observed that in the unloading operation when tongue units 150 are pushed under load units 24 with chain segments 198 revolving in an unloading direction, the wedge-shaped terminal channel segments 160 of the tongue units wedge themselves beneath the load units and serve as miniature ramps, lifting the leading edges of the load units and initiating the transfer to the extended tongues.

If the stored load includes gaps between pallets, these may be closed by stopping chains 100 momentarily during the loading operation. Conversely, if gaps between pallets are desired, the storage conveyers may be stopped momentarily.

During all operations chains 100 are maintained in taut, operable condition by the operation of the special chain tightener assembly illustrated in FIG. 4 and including pivotally mounted sprockets 106, 108.

It is to be understood that the form our invention herein shown and described is to be taken as a preferred example of the same and that various changes in the shape, size and arrangement of parts may be resorted to without departing from the spirit of the invention or the scope of the subjoined claims.

Having thus described our invention, we claim:

1. Vehicle loading and unloading apparatus comprising:
   (a) a support frame adapted to be positioned between a loading station and a vehicle,
   (b) a load carrying tongue reciprocably mounted on the frame,
   (c) frame conveyer means mounted on the frame for conveying a load between the loading station and the tongue,
   (d) tongue conveyer means mounted on the tongue communicating with the frame conveyer means for conveying the load between the frame conveyer means and the vehicle, and
   (e) tongue drive means connected to the tongue for reciprocating it between a retracted position in which it overlies the frame and an extended position in which it extends into the vehicle.

2. The apparatus of claim 1 including wheel means mounting the frame and adapted to traverse tracks arranged between the loading station and the vehicle on an axis substantially normal to the axis of the frame conveyer means.

3. The apparatus of claim 1 including wheel means mounting the frame and adapted to traverse tracks arranged between the loading station and the vehicle on an axis substantially normal to the axis of the frame conveyer means, and reversible motor means mounted on the frame and connected to at least one of the wheel means for driving the same.

4. The apparatus of claim 1 including a plurality of wheels mounting the frame and adapted to traverse tracks arranged between the loading station and the vehicle, a plurality of pairs of spaced lever arms aligned with the tracks, pivot means connecting the inner ends of the members of each lever arm pair to the frame, and journal means journalling one of the wheels on the outer ends of each lever arm pair.

5. The apparatus of claim 1 including a plurality of wheels mounting the frame and adapted to traverse tracks arranged between the loading station and the vehicle, a plurality of lever arms arranged with the inner ends of each lever arm pivoted to the frame and its outer ends rotatably mounting one of the wheels, and screw jack means operatively interconnecting each lever arm and the frame for adjusting the elevation of the frame.

6. The apparatus of claim 1 including a plurality of wheels on the respective sides of the apparatus, supporting the frame and adapted to traverse tracks placed between the loading station and the vehicle, a plurality of lever arms arranged with their inner ends pivoted to the frame and their outer ends each rotatably mounting one of the wheels, screw jack means operatively interconnecting each pivoted lever arm and the frame, and chain and sprocket drive means connected to the screw jack means positioned on the respective sides of the apparatus for selective adjustment of the height thereof.

7. The apparatus of claim 1 wherein the frame conveyer means comprises at least one pair of spaced, parallel endless drive chains having upper stretches arranged for frictional engagement with the underside of the load.

8. The apparatus of claim 1 wherein the frame conveyer means comprises at least one pair of spaced parallel endless drive chains having upper stretches arranged for frictional engagement with the underside of the load, drive sprocket means engaging the drive chain, a pair of chain tightening sprockets arranged one on each side of the drive sprocket and meshing with the chain, mounting means pivotally mounting each of the tightening sprockets to the frame, and spring means interconnecting the mounting means.

9. The apparatus of claim 1 wherein the load carrying tongue comprises a plurality of spaced elongated units and wheel means mounting the units on the frame.

10. The apparatus of claim 1 wherein the load carrying tongue comprises a plurality of spaced elongated units, and wheel means mounting the units on the frame, and wherein the tongue drive means comprises a length of chain fixed to each unit longitudinally thereof and reversible motor driven sprocket means meshing with the chain.

11. The apparatus of claim 1 wherein the load-carrying tongue comprises a plurality of spaced elongated units and wheel means mounting the units on the frame, each elongated unit comprising a plurality of overlapping nesting, channel members pivotally connected one to the other.

12. The apparatus of claim 1 wherein the load carrying tongue comprises a plurality of spaced elongated units and wheel means mounting the units on the frame, each elongated unit comprising a plurality of overlapping nesting, channel members pivotally connected one to the other; and wherein the tongue conveyer means comprises a plurality of shafts journaled between the overlapped channel members, sprockets arranged one on each end of each shaft, chain members interconnecting alternate pairs of sprockets, and chain drive means operatively connected to one of the sprockets.

(References on following page)

References Cited

UNITED STATES PATENTS

| | | | |
|---|---|---|---|
| 1,830,740 | 11/1931 | Leech et al. | 214—38 |
| 2,107,569 | 2/1938 | Hamlin | 214—41 |
| 2,591,153 | 4/1952 | Hodges | 214—516 |
| 2,748,965 | 6/1956 | Grey. | |
| 3,070,248 | 12/1962 | Mitchell | 214—731 |

GERALD M. FORLENZA, *Primary Examiner.*

R. G. SHERIDAN, *Examiner.*